US012331882B2

(12) United States Patent
Takami et al.

(10) Patent No.: US 12,331,882 B2
(45) Date of Patent: Jun. 17, 2025

(54) TANK

(71) Applicant: TOYOTA JIDOSHA KABUSHIKI KAISHA, Toyota (JP)

(72) Inventors: Masayoshi Takami, Hamamatsu (JP); Chihiro Uchimura, Toyota (JP); Akira Noumura, Nisshin (JP); Shinichi Nomura, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 118 days.

(21) Appl. No.: 18/330,787

(22) Filed: Jun. 7, 2023

(65) Prior Publication Data

US 2024/0044453 A1 Feb. 8, 2024

(30) Foreign Application Priority Data

Aug. 2, 2022 (JP) ................................ 2022-123622

(51) Int. Cl.
*F17C 1/16* (2006.01)

(52) U.S. Cl.
CPC ........ *F17C 1/16* (2013.01); *F17C 2201/0109* (2013.01); *F17C 2203/012* (2013.01); *F17C 2203/0604* (2013.01); *F17C 2203/0619* (2013.01); *F17C 2203/066* (2013.01); *F17C 2203/0673* (2013.01); *F17C 2205/0323* (2013.01); *F17C 2221/012* (2013.01); *F17C 2260/036* (2013.01); *F17C 2270/0168* (2013.01); *F17C 2270/0184* (2013.01)

(58) Field of Classification Search
CPC ...... F17C 2205/0305; F17C 2203/0631; F17C 1/16; F17C 2203/0604; F17C 2203/0619; F17C 13/04
See application file for complete search history.

(56) References Cited

U.S. PATENT DOCUMENTS

2007/0029701 A1* 2/2007 Pechtold ................ B29C 69/02 264/255
2008/0111322 A1* 5/2008 Otsubo ............... F16L 55/1108 277/654

(Continued)

FOREIGN PATENT DOCUMENTS

JP 2019116926 A 7/2019

*Primary Examiner* — Stephen J Castellano
(74) *Attorney, Agent, or Firm* — Hunton Andrews Kurth LLP

(57) ABSTRACT

A tank includes a liner, a neck that has a communicating orifice, a metal cylindrical member that is inserted into a lower end portion of the communicating orifice, and a valve that is inserted into the communicating orifice, wherein a lower end portion of the valve is inserted into the metal cylindrical member. The liner includes a wrap-around portion that wraps around to inside of the communicating orifice, and to contact with an outer circumferential face of the metal cylindrical member. A first O-ring is disposed in a circumferential direction between an inner circumferential face of the wrap-around portion and the outer circumferential face of the metal cylindrical member. A second O-ring is disposed in the circumferential direction between an inner circumferential face of the metal cylindrical member and an outer circumferential face of the lower end portion of the valve.

5 Claims, 3 Drawing Sheets

(56) References Cited

U.S. PATENT DOCUMENTS

| | | | | |
|---|---|---|---|---|
| 2010/0025411 | A1* | 2/2010 | Otsubo | F17C 1/14 220/581 |
| 2014/0263366 | A1* | 9/2014 | Breuer | F17C 1/005 220/586 |
| 2017/0276294 | A1* | 9/2017 | Almagro | F17C 1/06 |
| 2019/0170300 | A1* | 6/2019 | Cola | F17C 13/00 |
| 2019/0195428 | A1 | 6/2019 | Otsubo | |

* cited by examiner

TANK

CROSS-REFERENCE TO RELATED APPLICATION

This application claims priority to Japanese Patent Application No. 2022-123622 filed on Aug. 2, 2022, incorporated herein by reference in its entirety.

BACKGROUND

1. Technical Field

The disclosure relates to a tank.

2. Description of Related Art

Conventionally, there is an arrangement described in Japanese Unexamined Patent Application Publication No. 2019-116926 (JP 2019-116926 A), for example, in this technical field. A tank described in JP 2019-116926 A includes a liner made of resin that has a storage space for storing gas therein and an opening portion communicating with the storage space, a reinforcing layer formed on an outer circumferential face of the liner, a neck mounted to an opening portion of the liner, and a valve inserted into the neck. A tank having such a structure employs a seal structure in which an O-ring is disposed between the neck and the liner, in order to suppress leakage of gas that is stored.

SUMMARY

However, in the tank described above, a circumferential groove for fitting the O-ring in the neck needs to be provided, which complicates the structure of the neck. Also, integral molding of the liner made of resin and the neck, performed in order to improve ease of work and to suppress epoxy resin from intruding between the neck and the liner when forming the reinforcing layer, is attracting attention as of recent. However, when the liner and the neck are integrally molded, providing the neck with a circumferential groove for fitting the O-ring into further complicates the structure of the neck.

The disclosure provides a tank that has a simple structure and that is capable of securing sealing performance.

One aspect of the disclosure provides a tank. This tank is a tank that is cylindrical in shape and that has a storage space for storing gas, and includes, with an outer side of the tank as upward and an inner side of the tank as downward, along an axial direction of the tank, a liner that is made of resin, and in which the storage space is provided, a neck that is made of metal, and that is integrally molded with the liner and has a communicating orifice configured to communicate with the storage space, a metal cylindrical member that is inserted into a lower end portion of the communicating orifice of the neck and that is disposed coaxially with the communicating orifice, and a valve that is inserted into the communicating orifice to close off the neck, wherein a lower end portion of the valve is further inserted into the metal cylindrical member. The liner includes a wrap-around portion that is configured to wrap around to inside of the communicating orifice from a base portion of the neck, and to come into contact with an outer circumferential face of the metal cylindrical member, a first O-ring is disposed in a circumferential direction between an inner circumferential face of the wrap-around portion and the outer circumferential face of the metal cylindrical member, and a second O-ring is disposed in the circumferential direction between an inner circumferential face of the metal cylindrical member and an outer circumferential face of the lower end portion of the valve.

In the tank according to the above aspect, with respect to the liner and the neck which are integrally molded, the metal cylindrical member inserted into the lower end portion of the communicating orifice of the neck is used to dispose the first O-ring in the circumferential direction between the outer circumferential face of the metal cylindrical member and the inner circumferential face of the wrap-around portion of the liner, thereby securing sealing performance between the metal cylindrical member and the liner, and to dispose the second O-ring in the circumferential direction between the inner circumferential face of the metal cylindrical member and the outer circumferential face of the lower end portion of the valve inserted into the metal cylindrical member, thereby securing sealing performance between the metal cylindrical member and the valve. In this way, using the metal cylindrical member to realize both sealing performance between the metal cylindrical member and the liner, and sealing performance between the metal cylindrical member and the valve, does away with the need to provide the circumferential groove, into which the O-ring is fit, in the neck according to the conventional arrangement, and accordingly sealing performance of the tank can be secured with a simple structure.

In the tank according to the above aspect, the first O-ring and the second O-ring may be positioned at the same height in the axial direction of the tank. Thus, by aligning pressing forces of each of the first O-ring and the second O-ring at the same height, the pressing force is strengthened, and sealing performance between the metal cylindrical member and the liner, as well as sealing performance between the metal cylindrical member and the valve, can be improved.

In the tank according to the aspect described above, the metal cylindrical member may be configured to be fixed to the lower end portion of the communicating orifice of the neck by screwing. Thus, the metal cylindrical member can be easily and reliably inserted and fixed to the lower end portion of the communicating orifice of the neck, as compared to a method such as press-fitting. Also, the metal cylindrical member is detachably fixed to the lower end portion of the communicating orifice thereby, and accordingly the metal cylindrical member can be removed and replaced in a situation in which insertion into the communicating orifice fails.

In the tank according to the aspect described above, a first outer circumferential groove may be provided on the outer circumferential face of the metal cylindrical member, and the first O-ring may be disposed in the first outer circumferential groove. A second outer circumferential groove may be provided on the outer circumferential face of the lower end portion of the valve, and the second O-ring may be disposed in the second outer circumferential groove.

According to the disclosure, sealing performance of the tank can be secured with a simple structure.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

An embodiment of a tank according to the disclosure will be described below with reference to the drawings. In the following description, an example in which the tank is installed in a fuel cell electric vehicle and filled therein with high-pressure hydrogen gas will be described, however, the gas with which the tank can be filled is not limited to hydrogen gas, and may be various types of compressed gases such as compressed natural gas (CNG) and so forth, various types of liquefied gases such as liquefied natural gas (LNG) and liquefied petroleum gas (LPG), and so forth.

Figure 1:
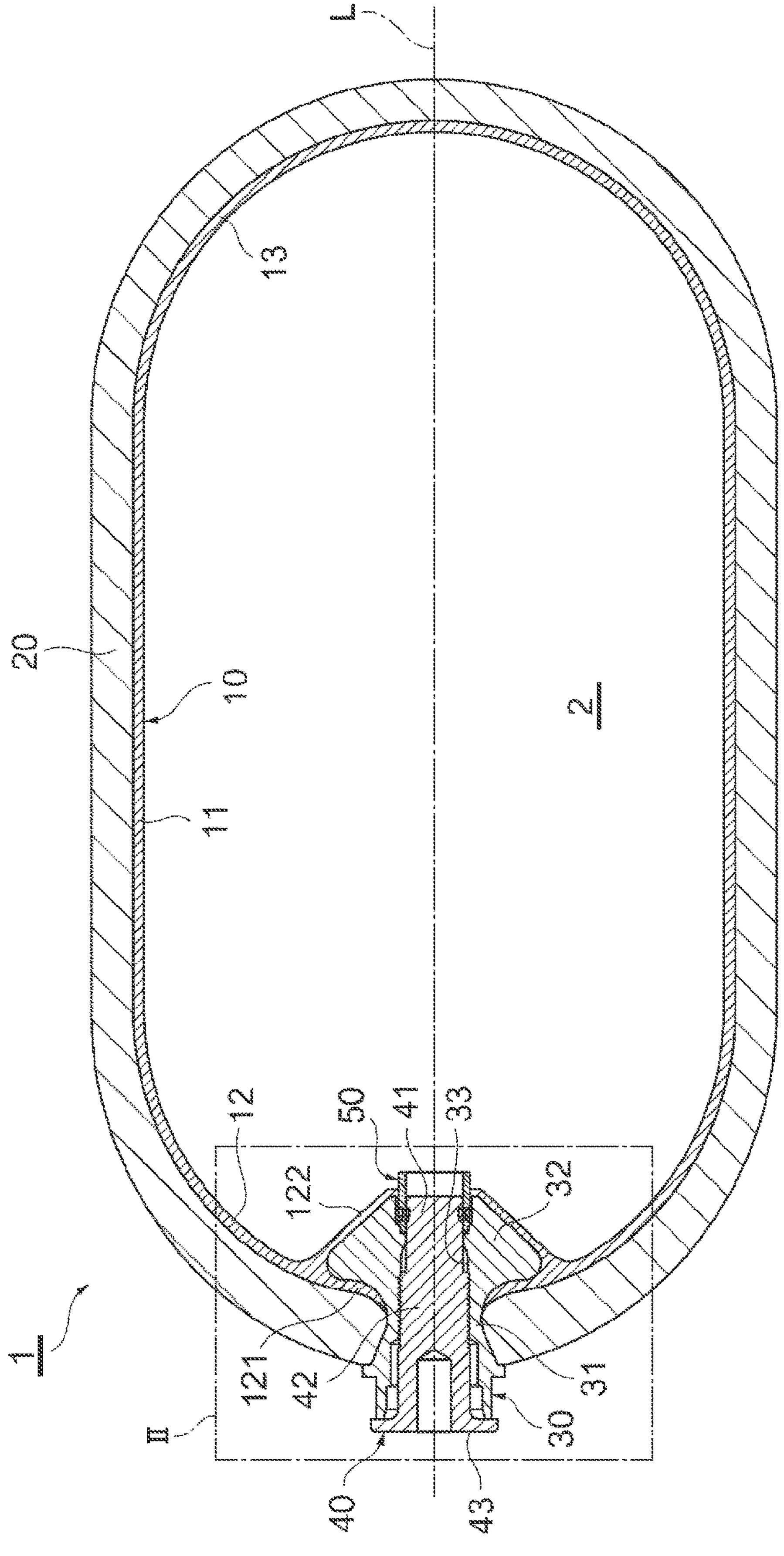
FIG. 1 is a sectional view of a tank according to an embodiment.
Figure 2:
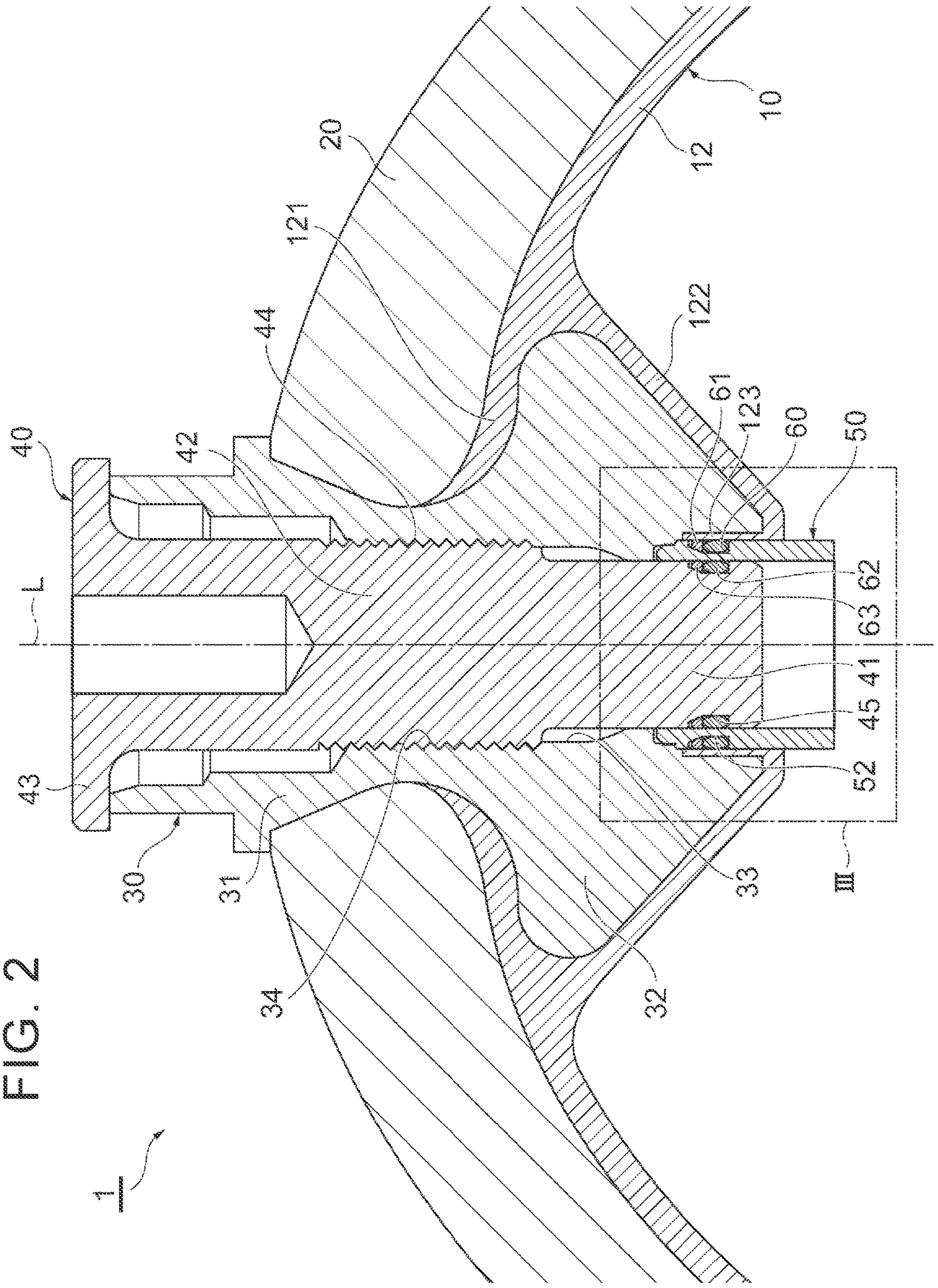
FIG. 2 is an enlarged sectional view of a portion II in FIG. 1.
Figure 3:
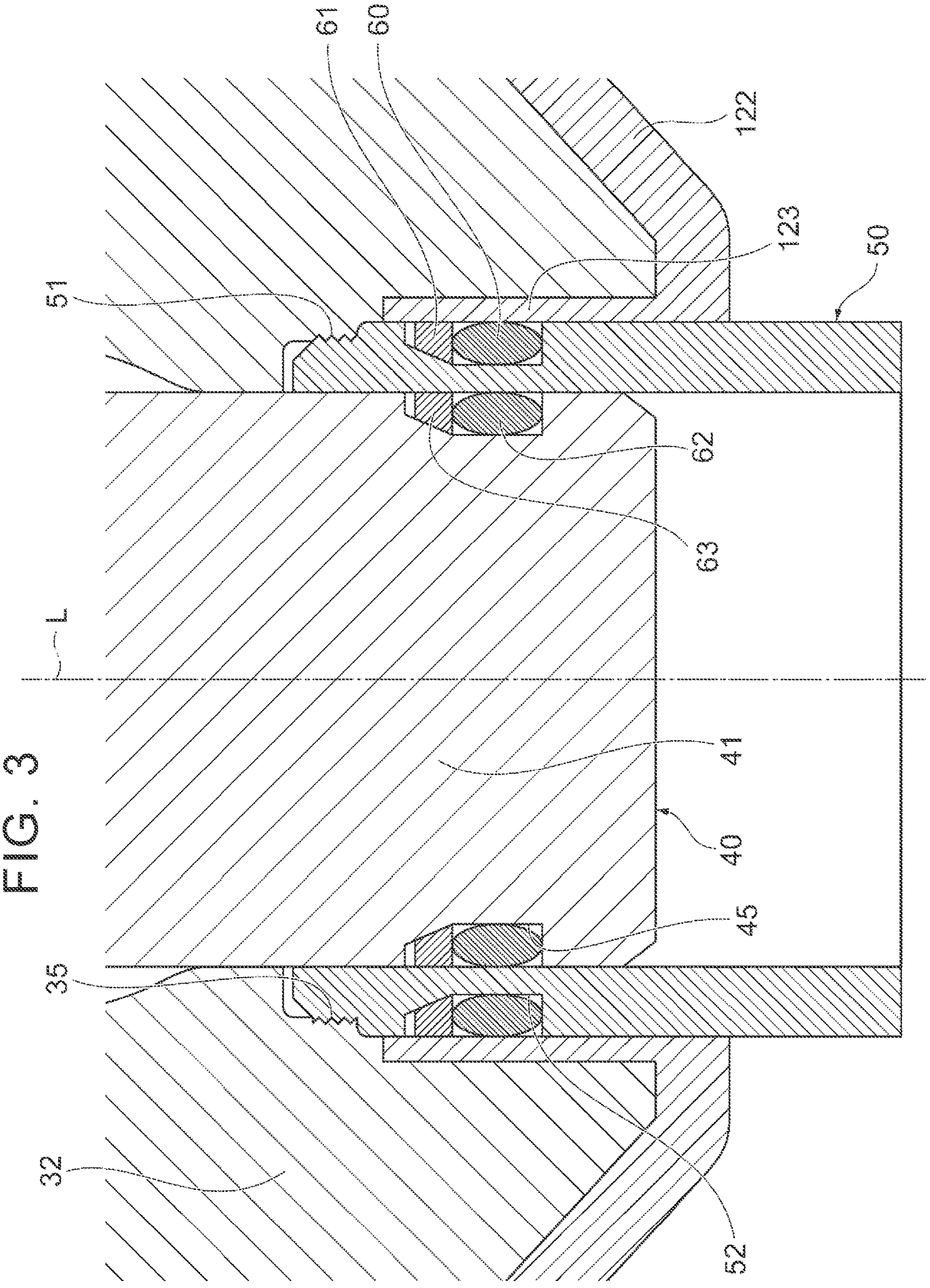
FIG. 3 is an enlarged sectional view of a portion III in FIG. 2.

FIG. 1 is a sectional view of a tank according to the embodiment, FIG. 2 is an enlarged sectional view of a portion II in FIG. 1, and FIG. 3 is an enlarged sectional view of a portion III in FIG. 2. As illustrated in FIG. 1, a tank 1 according to the present embodiment is a high-pressure gas storage container that is substantially cylindrical in shape and is rounded to be dome-shaped on both ends, and includes a liner 10 that has gas barrier properties, a reinforcing layer 20 that is formed so as to cover an outer circumferential face of the liner 10, a neck 30 attached to one end portion of the tank 1, and a valve 40 that closes off the neck 30.

The liner 10 is a hollow container having a storage space 2 for storing high-pressure hydrogen, and is formed of a resin material having gas barrier properties with respect to hydrogen gas. The liner 10 is made up of a body portion 11 that is cylindrical in shape and a pair of dome portions (a first dome portion 12 and a second dome portion 13) provided on a respective right-left sides of the body portion 11 in an axial direction (i.e., a direction of an axis L of the tank 1). The body portion 11 extends for a predetermined length along the direction of the axis L of the tank 1. The first dome portion 12 and the second dome portion 13 are formed continuing from both right and left sides of the body portion 11, and each has a hemispherical shape of which the diameter decreases the farther away from the body portion 11.

An opening portion is formed at a top portion of one of the dome portions (the first dome portion 12 in the present embodiment), and the neck 30 that is integrally molded with the liner 10 is inserted into the opening portion. On the other hand, no opening portion is formed in the second dome portion 13. Note that the second dome portion 13 may have an opening portion into which the neck 30 is inserted, in the same way as with the first dome portion 12.

The liner 10 having the structure described above is formed by injection molding, blow molding, or the like, using a resin material such as polyethylene, nylon, or the like, for example, to form each of a body part member, a first dome part member, and a second dome part member, and connecting these part members.

The reinforcing layer 20 is a layer that has a function of improving mechanical strength of the tank 1, such as rigidity, pressure resistance, and so forth, by reinforcing the liner 10, and is formed by winding a plurality of winds of a fiber-reinforced resin to the outer circumferential face of the liner 10 by filament winding (FW). The fiber-reinforced resin is formed by impregnating a fiber bundle made by binding fibers, which have a diameter of several micrometers or so, with a thermosetting resin, for example.

Examples of fibers include carbon fiber, glass fiber, aramid fiber, alumina fiber, boron fiber, steel fiber, polyparaphenylene benzobisoxazole (PBO) fiber, natural fiber, high-strength polyethylene fiber, and other such reinforcement fibers, with carbon fiber being preferable for use from the perspectives of reduced weight, mechanical strength, and so forth.

Examples of the thermosetting resin include epoxy resin, modified epoxy resin represented by vinyl ester resin, phenol resin, melamine resin, urea resin, unsaturated polyester resin, alkyd resin, polyurethane resin, and thermosetting polyimide resin. Note that a thermoplastic resin may be used as the resin by which the fiber bundle is impregnated.

The neck 30 is made by machining a metal material, such as stainless steel, aluminum alloy, or the like, into a predetermined shape. The neck 30 has a neck body portion 31 that is cylindrical in shape and that extends along the axis L direction of the tank 1, and a flange portion 32 that is connected to the neck body portion 31 and that protrudes in a radial direction of the tank 1. A communicating orifice 33 that communicates with the storage space 2 of the tank 1 is provided inside the neck body portion 31. The communicating orifice 33 has a substantially cylindrical shape. A first female screw portion 34 for screwing with the valve 40, and a second female screw portion 35 for screwing with a metal cylindrical member 50 (described later), are each formed on an inner circumferential wall of the neck body portion 31 (i.e., a portion forming the communicating orifice 33).

Next, the first dome portion 12 of the liner 10, the neck 30, and the valve 40 will be described in detail with reference to FIGS. 2 and 3. In the following description, an outer side of the tank 1 along the direction of the axis L of the tank 1 is an upper side, and an inner side of the tank 1 is a lower side, as illustrated in FIG. 2.

In the present embodiment, in order to increase the connection strength between the neck 30 and the liner 10 which are integrally molded (more specifically, insert-molded), the top portion of the first dome portion 12 is formed so as to follow the shape of the flange portion 32 of the neck 30. Specifically, the top portion of the first dome portion 12 includes an upper pressing portion 121 that extends to the upper side of the flange portion 32, so as to envelop the flange portion 32 and press the flange portion 32 from above, a side-lower support portion 122 that extends from a side wall of the flange portion 32 to a base portion (i.e., the base portion of the neck 30) to support the flange portion 32 from the side and below and a wrap-around portion 123 that is connected to the side-lower support portion 122 and that wraps around inside the communicating orifice 33 of the neck 30 from the base portion of the neck 30.

As illustrated in FIGS. 2 and 3, the wrap-around portion 123 of the liner 10 is not formed over the entire length of the communicating orifice 33 in the direction of the axis L of the tank 1, but rather extends to a lower end of the second female screw portion 35, so as not to impede screwing of a male screw portion 51 (described later) of the metal cylindrical member 50 with the second female screw portion 35 of the neck 30.

Also, the wrap-around portion 123 preferably has a thickness of 0.5 mm to 3 mm, and more preferably 1 mm to 2 mm, in the radial direction of the tank 1. This is a result of giving consideration to achieving both connection strength between the liner 10 and the neck 30 and mechanical strength of the metal cylindrical member 50, with securing fastening force between the neck 30 and the valve 40 as a premise. That is to say, when the wrap-around portion 123 of the liner 10 is made thicker on the premise that the outer diameter of the valve 40 is not changed, the connection strength between the liner 10 and the neck 30 can be increased, but the metal cylindrical member 50 will be thinner by that amount, and consequently, the mechanical strength of the metal cylindrical member 50 will decrease. On the other hand, when the metal cylindrical member 50 is made thicker, the wrap-around portion 123 becomes thinner, which will affect the connection strength between the liner 10 and the neck 30. When giving consideration to achieving both the connection strength between the liner 10 and the neck 30 and the mechanical strength of the metal cylindrical member 50, the thickness of the wrap-around portion 123 is preferably within the range described above.

The neck 30 that has such a structure is seamlessly and tightly connected to the first dome portion 12 of the liner 10 by insert-molding, for example, in a state in which an axial line of the communicating orifice 33 is situated coaxially with the axis L of the tank 1.

Also, the metal cylindrical member 50, which is cylindrical in shape, is inserted into a lower end portion of the communicating orifice 33 of the neck 30. As illustrated in FIG. 3, the male screw portion 51 for screwing with the second female screw portion 35 of the neck 30 is formed on an outer circumferential wall of an upper end portion of the metal cylindrical member 50. The metal cylindrical member 50 is fixed to the lower end portion of the communicating orifice 33 of the neck 30 by screwing the male screw portion 51 and the second female screw portion 35 of the neck 30 in a state of being situated coaxially with the communicating orifice 33.

It should be noted that the metal cylindrical member 50 is preferably formed such that the length thereof in the direction of the axis L of the tank 1 protrudes beyond a lower face of the liner 10 (more specifically, a lower face of the side-lower support portion 122) by at least 5 mm or more, in a state in which the metal cylindrical member 50 is fixed to the lower end portion of the communicating orifice 33 of the neck 30. Thus, the work of screwing the male screw portion 51 of the metal cylindrical member 50 and the second female screw portion 35 of the neck 30 can be easily performed.

Also, as illustrated in FIGS. 2 and 3, in a state of being fixed to the lower end portion of the communicating orifice 33, the metal cylindrical member 50 is in contact with an inner circumferential face of the wrap-around portion 123 of the first dome portion 12. A first O-ring 60 is disposed in a circumferential direction between an outer circumferential face of the metal cylindrical member 50 and the inner circumferential face of the wrap-around portion 123.

Specifically, an outer circumferential groove 52 (a first outer circumferential groove) is provided in the outer circumferential wall of the metal cylindrical member 50. The first O-ring 60 for sealing between the liner 10 and the metal cylindrical member 50 is fit into the outer circumferential groove 52. Further, a first backup ring 61, disposed toward the outer side of the tank 1 relative to the first O-ring 60, is fit into the outer circumferential groove 52. The first O-ring 60 and the first backup ring 61 are disposed in the outer circumferential groove 52 in close contact with each other.

The first O-ring 60 is an annular elastic member having a substantially circular cross-sectional shape, and is used to enhance sealing performance (in other words, airtightness) between the liner 10 and the metal cylindrical member 50. This first O-ring 60 is pressed against the inner circumferential face of the wrap-around portion 123 of the liner 10 that is adjacent thereto when the metal cylindrical member 50 is inserted into the lower end portion of the communicating orifice 33 of the neck 30, thereby sealing between the inner circumferential face of the wrap-around portion 123 and the outer circumferential face of the metal cylindrical member 50. The first O-ring 60 is made of a resin such as polytetrafluoroethylene (PTFE) or the like, for example.

The first backup ring 61 is an annular member having a trapezoidal cross-section. The first backup ring 61 is disposed upward from the first O-ring 60 in the direction of the axis L (i.e., toward the outer side of the tank 1) in the outer circumferential groove 52, suppressing upward movement of the first O-ring 60. The first backup ring 61 is made of a hard resin material such as a fluororesin material or nylon 46, for example, which has a smaller coefficient of friction than the first O-ring 60 and is less elastically deformable.

Note that in the present embodiment, the metal material used for the metal cylindrical member 50 is preferably different from the metal material used for the neck 30. For example, stainless steel (e.g., SUS316L) is used for the metal cylindrical member 50, and aluminum alloy is used for the neck 30, respectively. Thus, the strength of the metal cylindrical member 50 can be secured.

On the other hand, the valve 40 is a member for filling and discharging hydrogen gas to and from the storage space 2, and is formed of a metal material such as stainless steel, aluminum alloy, or the like. As illustrated in FIG. 2, the valve 40 is inserted into the communicating orifice 33 so as to close off the neck 30, and a lower end portion 41 thereof is further inserted into the metal cylindrical member 50.

The valve 40 includes the lower end portion 41 that can be inserted into a portion of the communicating orifice 33 of the neck 30 and a portion of the metal cylindrical member 50, a top plate portion 43 that is capable of abutting an upper end of the neck 30, and a body portion 42 that is disposed between the lower end portion 41 and the top plate portion 43, and that can be inserted into the communicating orifice 33 of the neck 30. A male screw portion 44, for screwing with the first female screw portion 34 that is formed on the inner circumferential wall of the neck body portion 31, is provided on a part of an outer circumferential face of the body portion 42.

Also, a second O-ring 62 is disposed in the circumferential direction between an outer circumferential face of the lower end portion 41 of the valve 40 and an inner circumferential face of the metal cylindrical member 50. Specifically, an outer circumferential groove 45 (a second outer circumferential groove) is provided in an outer circumferential wall of the lower end portion 41 of the valve 40. The second O-ring 62 for sealing between the valve 40 and the metal cylindrical member 50 is fit into the outer circumferential groove 45. Further, a second backup ring 63, disposed toward the outer side of the tank 1 relative to the second O-ring 62, is fit into the outer circumferential groove 45. The second O-ring 62 and the second backup ring 63 are disposed in the outer circumferential groove 45 in close contact with each other.

The second O-ring 62 is an annular elastic member having a substantially circular cross-sectional shape, and is used to enhance sealing performance (in other words, airtightness) between the valve 40 and the metal cylindrical member 50. The second O-ring 62 is pressed against the inner circumferential face of the metal cylindrical member 50 when the valve 40 is inserted into the communicating orifice 33 of the neck 30 and the metal cylindrical member 50, thereby sealing between the inner circumferential face of the metal cylindrical member 50 and the outer circumferential face of the lower end portion 41 of the valve 40. The second O-ring 62 is made of a resin such as polytetrafluoroethylene (PTFE) or the like, for example.

The second backup ring 63 is an annular member having a trapezoidal cross-section. The second backup ring 63 is disposed upward from the second O-ring 62 in the direction of the axis L (i.e., toward the outer side of the tank 1) in the outer circumferential groove 45, suppressing upward movement of the second O-ring 62. The second backup ring 63 is made of a hard resin material such as a fluororesin material, nylon 46, or the like, for example, which has a smaller coefficient of friction than the second O-ring 62 and is less elastically deformable.

Note that the first O-ring 60 and the second O-ring 62 are positioned at the same height in the direction of the axis L of the tank 1. Further, the first backup ring 61 and the second backup ring 63 are also positioned at the same height in the direction of the axis L of the tank 1.

In the tank 1 according to the present embodiment, with respect to the liner 10 and the neck 30 which are integrally molded, the metal cylindrical member 50 inserted into the lower end portion of the communicating orifice 33 of the neck 30 is used to dispose the first O-ring 60 between the outer circumferential face of the metal cylindrical member 50 and the inner circumferential face of the wrap-around portion 123 of the liner 10, thereby securing sealing performance between the metal cylindrical member 50 and the liner 10, and to dispose the second O-ring 62 between the inner circumferential face of the metal cylindrical member 50 and the outer circumferential face of the lower end portion 41 of the valve 40 inserted into the metal cylindrical member 50, thereby securing sealing performance between the metal cylindrical member 50 and the valve 40. Thus, using the metal cylindrical member 50 to realize both sealing performance between the metal cylindrical member 50 and the liner 10 and sealing performance between the metal cylindrical member 50 and the valve 40 does away with the need to provide the circumferential groove, into which the O-ring is fit, in the conventional neck, and accordingly sealing performance of the tank 1 can be secured with a simple structure.

Also, there is no need for work of assembling the liner 10 and the neck 30 that are separately manufactured to be performed, since the liner 10 and the neck 30 are integrally molded, thereby improving efficiency of work in manufacturing the tank 1, and also epoxy resin can be suppressed from intruding between the neck and the liner when forming the reinforcing layer 20. Further, providing the outer circumferential groove 52 for fitting the first O-ring 60 in the metal cylindrical member 50 enables squeeze for the first O-ring 60 to be easily secured, thereby manifesting advantages of improved stability of the seal.

Also, the first O-ring 60 and the second O-ring 62 are positioned at the same height in the direction of the axis L of the tank 1. Thus, by aligning the pressing forces of each of the first O-ring 60 and the second O-ring 62 at the same height, the pressing force is strengthened, and sealing performance between the metal cylindrical member 50 and the liner 10, as well as sealing performance between the metal cylindrical member 50 and the valve 40, can be improved.

Further, the metal cylindrical member 50 is fixed to the lower end portion of the communicating orifice 33 of the neck 30 by screwing, and accordingly the metal cylindrical member 50 can be easily and reliably inserted and fixed to the lower end portion of the communicating orifice 33, as compared to a method such as press-fitting or the like. Also, the metal cylindrical member 50 is thus detachably fixed to the lower end portion of the communicating orifice 33, and accordingly the metal cylindrical member 50 can be removed and replaced in a situation in which insertion into the communicating orifice 33 fails.

Although an embodiment of the disclosure has been described in detail above, the disclosure is not limited to the embodiment described above, and various types of design alterations can be made without departing from the spirit of the disclosure described in the claims.

What is claimed is:

1. A tank that is cylindrical in shape and that has a storage space for storing gas, the tank comprising:

with an outer side of the tank as upward and an inner side of the tank as downward, along an axial direction of the tank, a liner that is made of resin, and in which the storage space is provided;

a neck that is made of metal, and that is integrally molded with the liner, the neck having a communicating orifice configured to communicate with the storage space;

a metal cylindrical member that is inserted into a lower end portion of the communicating orifice of the neck and that is disposed coaxially with the communicating orifice; and a valve that is inserted into the communicating orifice to close off the neck, wherein;

a lower end portion of the valve is inserted into the metal cylindrical member;

the liner includes a wrap-around portion that is configured to wrap around to inside of the communicating orifice from a base portion of the neck, and to come into contact with an outer circumferential face of the metal cylindrical member;

a first O-ring is disposed in a circumferential direction of the tank between an inner circumferential face of the wrap-around portion and the outer circumferential face of the metal cylindrical member;

a first backup ring is disposed upward from the first O-ring in the axial direction of the tank;

a first outer circumferential groove is provided on the outer circumferential face of the metal cylindrical member;

the first O-ring and the first backup ring are disposed in the first outer circumferential groove, in contact with each other;

a second O-ring is disposed in the circumferential direction of the tank between an inner circumferential face of the metal cylindrical member and an outer circumferential face of the lower end portion of the valve;

a second backup ring is disposed upward from the second O-ring in the axial direction of the tank;

a second outer circumferential groove is provided on the outer circumferential face of the lower end portion of the valve; and the second O-ring and the second backup ring are disposed in the second outer circumferential groove, in contact with each other.

2. The tank according to claim 1, wherein the first O-ring and the second O-ring are positioned at the same height in the axial direction of the tank.

3. The tank according to claim 1, wherein the metal cylindrical member is fixed to the lower end portion of the communicating orifice of the neck by screwing.

4. The tank according to claim 1, wherein the first O-ring is an annular member having a substantially circular cross-sectional shape;

the first backup ring is an annular member having a trapezoidal cross-section shape;

the first backup ring has a lower coefficient of friction than the first O-ring; and the first backup ring is less elastically deformable than the first O-ring.

5. The tank according to claim 1, wherein the wrap-around portion has a thickness of 0.5 mm to 3 mm, in a radial direction of the tank.

* * * * *